United States Patent
Eisen

(10) Patent No.: US 10,417,637 B2
(45) Date of Patent: Sep. 17, 2019

(54) SYSTEMS AND METHODS FOR ACCESSING RECORDS VIA DERIVATIVE LOCATORS

(71) Applicant: The 41st Parameter, Inc., Scottsdale, AZ (US)

(72) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 383 days.

(21) Appl. No.: 14/609,388

(22) Filed: Jan. 29, 2015

(65) Prior Publication Data

US 2015/0294316 A1    Oct. 15, 2015

Related U.S. Application Data

(63) Continuation of application No. PCT/US2013/053495, filed on Aug. 2, 2013.
(Continued)

(51) Int. Cl.
  *G06Q 20/40*  (2012.01)
  *G06F 16/245* (2019.01)
  (Continued)

(52) U.S. Cl.
  CPC ..... *G06Q 20/4016* (2013.01); *G06F 16/2322* (2019.01); *G06F 16/245* (2019.01);
  (Continued)

(58) Field of Classification Search
  CPC ..... G06Q 40/10; G06Q 40/12; G06Q 20/4016
  (Continued)

(56) References Cited

U.S. PATENT DOCUMENTS

| 4,805,222 A | 2/1989 | Young et al. |
| 4,912,761 A | 3/1990 | Tan et al. |

(Continued)

FOREIGN PATENT DOCUMENTS

| EP | 0 418 144 | 3/1991 |
| EP | 0 923 039 | 6/1999 |

(Continued)

OTHER PUBLICATIONS

"Definition of ISO 8583 from Wikipedia. Accessed on Apr. 13, 2015.".

(Continued)

*Primary Examiner* — Florian M Zeender
*Assistant Examiner* — Christopher R Buchanan
(74) *Attorney, Agent, or Firm* — Knobbe, Martens, Olson & Bear, LLP

(57) ABSTRACT

Systems and methods are provided for accessing records using derivative locators. An open financial transaction may be initiated by a consumer at a merchant. The merchant may provide information relating to the transaction, which may include information about the consumer's device, to a repository. The merchant may provide transaction information to the acquiring bank, which may provide transaction to the global financial network, which may provide transaction information to an issuing bank. One or more requesting party (e.g., one or more of the acquiring bank, global financial network, or issuing bank) may formulate a derivative locator based on the transaction information received. The derivative locator may function as an index through which records in the repository may be accessed by the requesting party. A time comparison may be made in assisting with accessing the correct record in the repository. The requesting party may determine whether to accept or decline (Continued)

the transaction, optionally with the aid of the information accessed from the repository.

20 Claims, 6 Drawing Sheets

Related U.S. Application Data

(60) Provisional application No. 61/679,048, filed on Aug. 2, 2012, provisional application No. 61/704,320, filed on Sep. 21, 2012, provisional application No. 61/728,713, filed on Nov. 20, 2012.

(51) Int. Cl.
*G06F 16/23* (2019.01)
*G06Q 40/00* (2012.01)
*G06Q 40/02* (2012.01)

(52) U.S. Cl.
CPC ............. *G06Q 40/02* (2013.01); *G06Q 40/10* (2013.01); *G06Q 40/12* (2013.12)

(58) Field of Classification Search
USPC .......................................................... 705/30
See application file for complete search history.

(56) References Cited

U.S. PATENT DOCUMENTS

| | | | |
|---|---|---|---|
| 4,924,387 A | 5/1990 | Jeppesen | |
| 5,184,849 A | 2/1993 | Taylor | |
| 5,491,735 A | 2/1996 | Hsieh | |
| 5,519,827 A | 5/1996 | Mizushima | |
| 5,521,907 A | 5/1996 | Ennis, Jr. | |
| 5,557,686 A | 9/1996 | Brown et al. | |
| 5,627,886 A | 5/1997 | Bowman | |
| 5,679,940 A | 10/1997 | Templeton et al. | |
| 5,721,765 A | 2/1998 | Smith | |
| 5,724,424 A | 3/1998 | Giffor | |
| 5,748,740 A | 5/1998 | Curry et al. | |
| 5,748,780 A | 5/1998 | Stolfo et al. | |
| 5,764,275 A | 6/1998 | Lappington et al. | |
| 5,802,156 A | 9/1998 | Felger | |
| 5,819,226 A | 10/1998 | Gopinathan et al. | |
| 5,864,620 A | 1/1999 | Pettitt | |
| 5,884,289 A | 3/1999 | Anderson et al. | |
| 5,886,334 A | 3/1999 | D'Entremont | |
| 5,892,900 A | 4/1999 | Ginter et al. | |
| 5,894,510 A | 4/1999 | Felger | |
| 5,899,980 A | 5/1999 | Wilf et al. | |
| 5,903,721 A | 5/1999 | Sixtus | |
| 5,933,480 A | 8/1999 | Felger | |
| 5,960,069 A | 9/1999 | Felger | |
| 6,009,523 A | 12/1999 | Owaki et al. | |
| 6,029,154 A | 2/2000 | Pettitt | |
| 6,029,159 A | 2/2000 | Zorba et al. | |
| 6,062,474 A | 5/2000 | Kroll | |
| 6,078,907 A | 6/2000 | Lamm | |
| 6,092,053 A | 7/2000 | Boesch et al. | |
| 6,094,643 A | 7/2000 | Anderson et al. | |
| 6,105,012 A | 8/2000 | Chang et al. | |
| 6,112,240 A | 8/2000 | Pogue et al. | |
| 6,148,407 A | 11/2000 | Aucsmith | |
| 6,151,593 A | 11/2000 | Cho et al. | |
| 6,163,604 A | 12/2000 | Baulier et al. | |
| 6,163,771 A | 12/2000 | Walker et al. | |
| 6,164,528 A * | 12/2000 | Hills ..................... | G06Q 20/04 235/379 |
| 6,205,436 B1 | 3/2001 | Rosenberg et al. | |
| 6,209,104 B1 | 3/2001 | Jalili | |
| 6,216,153 B1 | 4/2001 | Vortriede | |
| 6,223,289 B1 | 4/2001 | Wall et al. | |
| 6,282,276 B1 | 8/2001 | Felger | |
| 6,295,605 B1 | 9/2001 | Dockter et al. | |
| 6,327,384 B1 | 12/2001 | Hirao et al. | |
| 6,330,546 B1 | 12/2001 | Gopinathan et al. | |
| 6,405,922 B1 | 6/2002 | Kroll | |
| 6,442,529 B1 | 8/2002 | Krishan et al. | |
| 6,442,692 B1 | 8/2002 | Zilberman | |
| 6,457,021 B1 | 9/2002 | Berkowitz et al. | |
| 6,480,710 B1 | 11/2002 | Laybourn et al. | |
| 6,509,847 B1 | 1/2003 | Anderson | |
| 6,523,019 B1 | 2/2003 | Borthwick | |
| 6,546,493 B1 | 4/2003 | Magdych et al. | |
| 6,553,108 B1 | 4/2003 | Felger | |
| 6,560,455 B2 | 5/2003 | Amin et al. | |
| 6,567,099 B1 | 5/2003 | Dawson | |
| 6,597,775 B2 | 7/2003 | Lawyer et al. | |
| 6,646,765 B1 | 11/2003 | Barker et al. | |
| 6,678,666 B1 | 1/2004 | Boulware | |
| 6,687,390 B2 | 2/2004 | Avni et al. | |
| 6,687,696 B2 | 2/2004 | Hofmann et al. | |
| 6,689,055 B1 | 2/2004 | Mullen et al. | |
| 6,718,363 B1 | 4/2004 | Ponte | |
| 6,745,333 B1 | 6/2004 | Thomsen | |
| 6,803,920 B2 | 10/2004 | Gossett et al. | |
| 6,804,624 B2 | 10/2004 | Silverman | |
| 6,850,606 B2 | 2/2005 | Lawyer et al. | |
| 6,892,307 B1 | 5/2005 | Wood et al. | |
| 6,895,507 B1 | 5/2005 | Tepler | |
| 6,895,514 B1 | 5/2005 | Kermani | |
| 6,898,709 B1 | 5/2005 | Teppler | |
| 6,908,030 B2 | 6/2005 | Rajasekaran et al. | |
| 6,937,569 B1 | 8/2005 | Sarkar et al. | |
| 6,947,978 B2 | 9/2005 | Huffman | |
| 6,954,532 B1 | 10/2005 | Handley et al. | |
| 6,957,185 B1 | 10/2005 | Labaton | |
| 6,957,339 B2 | 10/2005 | Shinzaki | |
| 7,002,712 B2 | 2/2006 | Barker et al. | |
| 7,003,670 B2 | 2/2006 | Heaven et al. | |
| 7,007,174 B2 | 2/2006 | Wheeler et al. | |
| 7,013,001 B1 | 3/2006 | Felger | |
| 7,027,800 B2 | 4/2006 | Haumont et al. | |
| 7,039,505 B1 | 5/2006 | Southard et al. | |
| 7,039,699 B1 | 5/2006 | Narin et al. | |
| 7,043,640 B2 | 5/2006 | Pritchard et al. | |
| 7,089,310 B1 | 8/2006 | Ellerman et al. | |
| 7,089,585 B1 | 8/2006 | Dharmarajan | |
| 7,096,192 B1 | 8/2006 | Pettitt | |
| 7,100,049 B2 | 8/2006 | Gasparini et al. | |
| 7,103,570 B1 | 9/2006 | Morea et al. | |
| 7,120,590 B1 | 10/2006 | Eisen et al. | |
| 7,130,858 B2 | 10/2006 | Ciaramitaro et al. | |
| 7,143,095 B2 | 11/2006 | Barrett et al. | |
| 7,158,622 B2 | 1/2007 | Lawyer et al. | |
| 7,165,051 B2 | 1/2007 | Ronning et al. | |
| 7,174,454 B2 | 2/2007 | Roskind | |
| 7,191,467 B1 | 3/2007 | Dujari et al. | |
| 7,197,646 B2 | 3/2007 | Fritz et al. | |
| 7,221,949 B2 | 5/2007 | Clough | |
| 7,225,974 B2 | 6/2007 | Yamauchi | |
| 7,237,717 B1 | 7/2007 | Rao et al. | |
| 7,249,093 B1 | 7/2007 | King | |
| 7,251,624 B1 | 7/2007 | Lee et al. | |
| 7,260,837 B2 | 8/2007 | Abraham et al. | |
| 7,263,492 B1 | 8/2007 | Suresh et al. | |
| 7,263,506 B2 | 8/2007 | Lee et al. | |
| 7,272,610 B2 | 9/2007 | Torres | |
| 7,272,728 B2 | 9/2007 | Pierson et al. | |
| 7,292,723 B2 | 11/2007 | Tedesco et al. | |
| 7,293,096 B1 | 11/2007 | Foltak et al. | |
| 7,296,088 B1 | 11/2007 | Padmanabhan et al. | |
| 7,328,216 B2 | 2/2008 | Hofmann et al. | |
| 7,330,824 B1 | 2/2008 | Kanojia et al. | |
| 7,330,871 B2 | 2/2008 | Barber | |
| 7,340,045 B2 | 3/2008 | Felger | |
| 7,346,551 B2 | 3/2008 | Pe Jimenez et al. | |
| 7,346,775 B2 | 3/2008 | Gasparinl et al. | |
| 7,349,955 B1 | 3/2008 | Korb et al. | |
| 7,359,962 B2 | 4/2008 | Willebeek-LeMair et al. | |
| 7,363,170 B2 | 4/2008 | Seul et al. | |
| 7,373,669 B2 | 5/2008 | Eisen | |
| 7,376,618 B1 | 5/2008 | Anderson et al. | |

(56) References Cited

U.S. PATENT DOCUMENTS

| | | |
|---|---|---|
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,778,846 B2 | 8/2010 | Suresh et al. |
| 7,813,937 B1 | 10/2010 | Pathria et al. |
| 7,813,944 B1 | 10/2010 | Luk et al. |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 * | 2/2013 | Grossman .............. G06Q 40/00 705/35 |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |

(56) References Cited

U.S. PATENT DOCUMENTS

| | | |
|---|---|---|
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,660,539 B2 | 2/2014 | Khambete et al. |
| 8,683,561 B2 | 3/2014 | Utin |
| 8,688,543 B2 | 4/2014 | Dominquez |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,060,012 B2 | 6/2015 | Eisen |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,191,370 B2 | 11/2015 | Barber et al. |
| 9,196,004 B2 | 11/2015 | Eisen |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,514,248 B1 | 12/2016 | Guan et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,633,201 B1 | 4/2017 | Katz |
| 9,703,983 B2 | 7/2017 | Eisen et al. |
| 9,754,256 B2 | 9/2017 | Britton et al. |
| 9,754,311 B2 | 9/2017 | Eisen |
| 9,785,973 B2 | 10/2017 | Tollinger et al. |
| 9,948,629 B2 | 4/2018 | Eisen |
| 9,990,631 B2 | 6/2018 | Eisen |
| 10,021,099 B2 | 7/2018 | Eisen et al. |
| 10,089,679 B2 | 10/2018 | Eisen |
| 10,091,312 B1 | 10/2018 | Khanwalkar et al. |
| 2001/0011243 A1 | 8/2001 | Dembo et al. |
| 2001/0011304 A1 | 8/2001 | Wesinger, Jr. et al. |
| 2001/0016840 A1 | 8/2001 | Hijikata et al. |
| 2001/0016876 A1 | 8/2001 | Kurth et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1* | 5/2002 | Bozeman ............ G06Q 20/04 705/64 |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0185225 A1 | 8/2005 | Brawn et al. |

(56) References Cited

U.S. PATENT DOCUMENTS

| | | |
|---|---|---|
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0155985 A1 | 7/2006 | Canard et al. |
| 2006/0161501 A1 | 7/2006 | Waserstein et al. |
| 2006/0190331 A1 | 8/2006 | Tollinger et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2007/0011078 A1 | 1/2007 | Jain et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0046562 A1 | 2/2008 | Butler |
| 2008/0052629 A1 | 2/2008 | Phillips et al. |
| 2008/0071682 A1 | 3/2008 | Dominguez |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0120195 A1 | 5/2008 | Shakkarwar |
| 2008/0120214 A1 | 5/2008 | Steele et al. |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184372 A1 | 7/2008 | Hoshina |
| 2008/0189790 A1 | 8/2008 | Park |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0249820 A1 | 10/2008 | Pathria et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0018940 A1 | 1/2009 | Wang et al. |
| 2009/0024971 A1 | 1/2009 | Willner et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0089869 A1 | 4/2009 | Varghese |
| 2009/0106413 A1 | 4/2009 | Salo |
| 2009/0138590 A1 | 5/2009 | Lee et al. |
| 2009/0157417 A1 | 6/2009 | Bradley et al. |
| 2009/0164269 A1 | 6/2009 | Gupta et al. |
| 2009/0177692 A1 | 7/2009 | Chagoly et al. |
| 2009/0183010 A1 | 7/2009 | Schnell et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0070606 A1 | 3/2010 | Shenfield et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0321296 A1 | 12/2010 | Gross |
| 2010/0333170 A1 | 12/2010 | Cox et al. |

(56) References Cited

U.S. PATENT DOCUMENTS

| | | |
|---|---|---|
| 2011/0022483 A1 | 1/2011 | Hammad |
| 2011/0022517 A1 | 1/2011 | Hammad |
| 2011/0035302 A1 | 2/2011 | Martell et al. |
| 2011/0047072 A1 | 2/2011 | Ciurea |
| 2011/0082768 A1 | 4/2011 | Eisen |
| 2011/0112901 A1 | 5/2011 | Fried et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1* | 9/2011 | Nightengale .......... G06Q 20/20 705/44 |
| 2011/0251951 A1 | 10/2011 | Kolkowitz et al. |
| 2011/0258118 A1* | 10/2011 | Ciurea .................. G06Q 20/40 705/44 |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0054136 A1 | 3/2012 | Maulik |
| 2012/0054847 A1 | 3/2012 | Schultz et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215896 A1 | 8/2012 | Johannsen |
| 2012/0216282 A1 | 8/2012 | Pappu et al. |
| 2012/0221470 A1 | 8/2012 | Lyon |
| 2012/0222111 A1 | 8/2012 | Oliver et al. |
| 2012/0233665 A1* | 9/2012 | Ranganathan .......... G06F 21/33 726/4 |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0278127 A1 | 11/2012 | Kirakosyan et al. |
| 2012/0295580 A1 | 11/2012 | Corner |
| 2012/0297380 A1 | 11/2012 | Colbert et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0330787 A1 | 12/2012 | Hanson et al. |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0144539 A1 | 6/2013 | Allen et al. |
| 2013/0148525 A1 | 6/2013 | Cuadra Sanchez et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0226717 A1 | 8/2013 | Ahluwalia et al. |
| 2013/0339186 A1* | 12/2013 | French .................. G06F 21/577 705/26.35 |
| 2014/0032902 A1 | 1/2014 | Agrawal et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0046989 A1 | 2/2015 | Oberheide et al. |
| 2015/0106270 A1 | 4/2015 | Burrell et al. |
| 2015/0127825 A1 | 5/2015 | Johannsen |
| 2015/0186901 A1 | 7/2015 | Miltonberger |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0242861 A9 | 8/2015 | Baldassano |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0125461 A1 | 5/2016 | Sivaramakrishnan et al. |
| 2016/0246581 A1 | 8/2016 | Jimenez et al. |
| 2016/0321701 A1 | 11/2016 | Tollinger et al. |
| 2017/0039571 A1 | 2/2017 | Eisen |
| 2017/0142106 A1 | 5/2017 | Eisen et al. |
| 2018/0089459 A1 | 3/2018 | Eisen et al. |
| 2018/0101890 A1 | 4/2018 | Eisen |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |

FOREIGN PATENT DOCUMENTS

| | | |
|---|---|---|
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2003-050910 | 2/2003 |
| JP | 2005063216 A | 3/2005 |
| JP | 2005-115644 | 4/2005 |
| JP | 2005-135431 | 5/2005 |
| JP | 2006-004333 | 1/2006 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535124 | 8/2008 |
| JP | 2008-243008 | 10/2008 |
| JP | 2008-257434 | 10/2008 |
| JP | 2008-269229 | 11/2008 |
| JP | 2009-048538 | 3/2009 |
| JP | 2009-122880 | 6/2009 |
| JP | 2009-175984 | 8/2009 |

(56) References Cited

FOREIGN PATENT DOCUMENTS

| | | |
|---|---|---|
| JP | 2010-020728 | 1/2010 |
| JP | 2010-061254 | 3/2010 |
| JP | 2010-122955 | 6/2010 |
| JP | 2010-122956 | 6/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159307 | 8/2011 |
| JP | 2012-234503 | 11/2012 |
| JP | 5216932 | 6/2013 |
| KR | 10-1999-0015738 | 3/1999 |
| KR | 10-0645983 | 11/2006 |
| KR | 1020080044558 | 5/2008 |
| KR | 10-2009-0051977 | 9/2009 |
| KR | 1020100085888 | 7/2010 |
| WO | WO 96/041488 | 12/1996 |
| WO | WO 97/003410 | 1/1997 |
| WO | WO 99/050775 | 10/1999 |
| WO | WO 01/011450 | 2/2001 |
| WO | WO 01/033520 | 5/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 A2 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/142722 | 9/2013 |
| WO | WO 2014/022813 | 2/2014 |
| WO | WO 2014/078569 | 5/2014 |

OTHER PUBLICATIONS

International search report and written opinion dated Nov. 22, 2013 for PCT/US2013/053495.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Gralla, Preston, "How the Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 19, 2015.
Provisional Application as filed in U.S. Appl. No. 61/324,312, dated Apr. 15, 2010 in 15 pages.

(56) References Cited

OTHER PUBLICATIONS

Summons to Attend Oral Proceedings received in European Application No. EP09735653, dated Oct. 7, 2016.

* cited by examiner

DERIVATIVE LOCATOR(N)

| CREDIT CARD # | TRANSACTION AMOUNT |
|---|---|

| TIMESTAMP (TN) |
|---|

REPOSITORY

| DERIVATIVE LOCATOR | TIME | DEVICE, TRANSACTION, AND/OR OTHER RECORDS |
|---|---|---|
| DL1 | T1 | |
| DL2 | T2 | |
| DL3 | T3 | |
| DL4 | T4 | |
| DL5 | T5 | |
| . | . | . |
| . | . | . |
| . | . | . |

FIG. 3

SYSTEMS AND METHODS FOR ACCESSING RECORDS VIA DERIVATIVE LOCATORS

CROSS REFERENCE

This application is a continuation application of PCT/US2013/053495, filed on Aug. 2, 2013 which claims the benefit of U.S. Provisional Application No. 61/679,048 filed Aug. 2, 2012, U.S. Provisional Application No. 61/704,320 filed Sep. 21, 2012, and U.S. Provisional Application No. 61/728,713 filed Nov. 20, 2012, which applications are incorporated herein by reference in their entirety.

BACKGROUND OF THE INVENTION

In a commercial transaction, such as an ecommerce transaction, a consumer provides a merchant with several data points. An authorization message is typically sent to a card network and the transaction is routed to an issuer for response. However, there exists a risk of fraudulent transactions.

Challenges remain in detecting these fraudulent transactions. A need exists to provide access to information that may aid in detection of fraudulent transactions.

SUMMARY OF THE INVENTION

The invention provides systems and methods for accessing information via derivative locators. Various aspects of the invention described herein may be applied to any of the particular applications set forth below. The invention may be applied as a standalone financial transaction or ecommerce system or as a component of an integrated fraud detection system or solution. The invention can be optionally integrated into existing business and processes seamlessly, for example, with financial transaction verification parties and flow. It shall be understood that different aspects of the invention can be appreciated individually, collectively or in combination with each other.

An aspect of the invention is directed to a method of accessing records from a repository. The method may comprise receiving transaction information for an open transaction; formulating, with aid of a processor, a derivative locator based on the received transaction information; searching the repository for index information corresponding to the derivative locator; and receiving records from the repository corresponding to the index information. The derivative locator may be formulated based on a credit card number used in the open transaction and a transaction amount from the open transaction. The method may further comprise capturing a request timestamp after receiving the transaction information and prior to searching the repository; and comparing, with aid of a processor, the request timestamp with a stored timestamp in the repository corresponding to the index information.

Aspects of the invention may be directed to a method of approving or not approving a transaction between a user device and a merchant comprising: receiving a derivative locator, wherein said derivative locator is formulated based on transaction information between the user device and the merchant; providing the derivative locator to a repository as an index to the repository; receiving records from the repository corresponding to the index of the repository; determining, with aid of a processor, whether to approve or not approve the transaction based on the records received from the repository; and providing an indicator to approve or not approve the transaction based on the records received from the repository.

An additional aspect of the invention may include a system for accessing records from a repository comprising: a user interface which may accept input relating to an online transaction; a processor configured to formulate a derivative locator based on information about the transaction; and a repository comprising a memory for storing records regarding a user or user device, wherein the records are accessible via an index corresponding to the derivative locator.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 shows an example of a derivative locator used to access information a repository.

DETAILED DESCRIPTION OF THE INVENTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Figure 1:
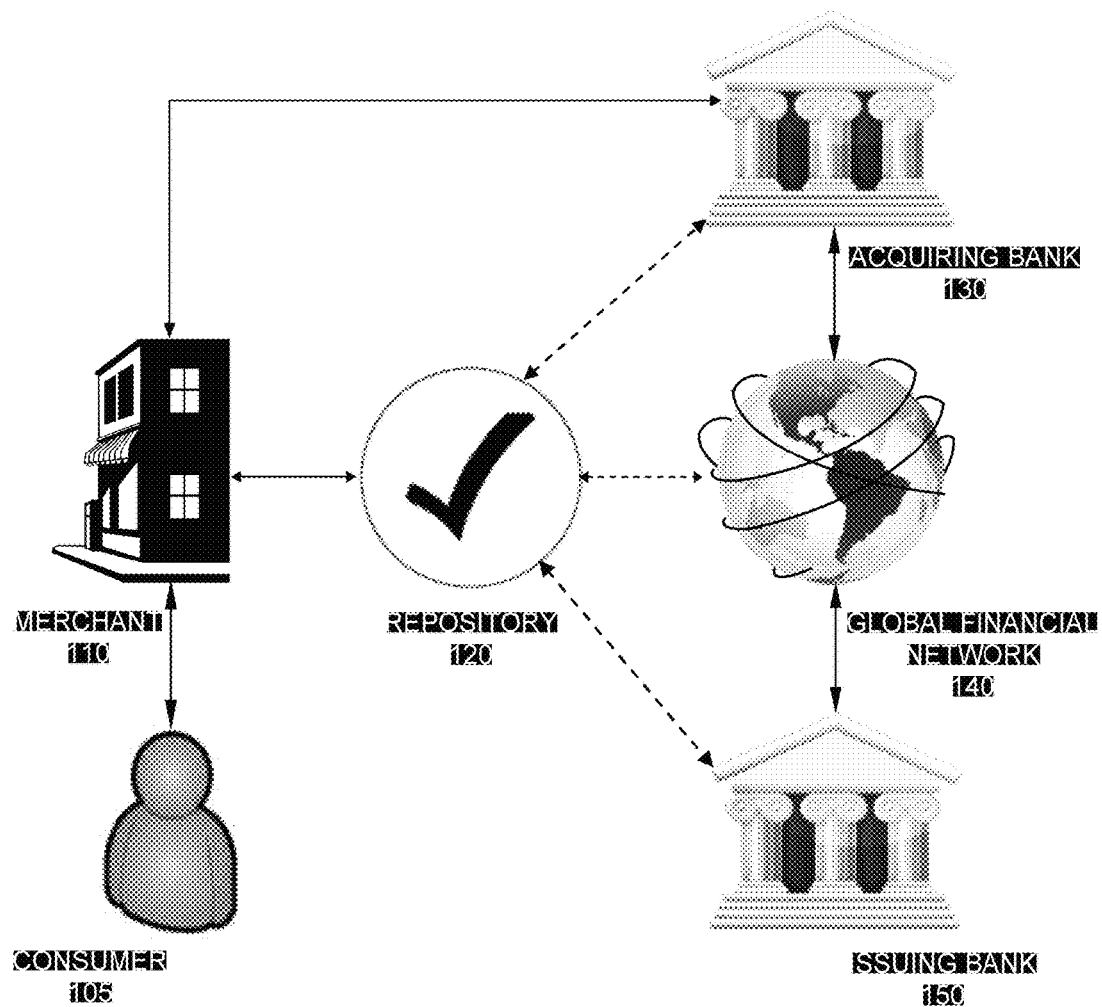
FIG. 1 shows an example of a records access system provided in accordance with an embodiment of the invention.

FIG. 1 shows an example of a records access system provided in accordance with an embodiment of the invention. A consumer 105 may interact with a merchant 110. The merchant may send information about the transaction, and/or a device used by the consumer to a repository 120. The merchant may also send information about the transaction and/or the device to an acquiring bank 130. The acquiring bank may send information about the transaction to a global financial network 140 (e.g., card network). The global financial network may send information about the transaction to an issuing bank 150. The acquiring bank, global financial network, and/or issuing bank may be capable of communicating with the repository. In some embodiments, additional or alternative entities may be involved in the communications and sharing of transaction information. Any of the additional or alternative entities may be capable of communicating with the repository. The acquiring bank, global financial network, and/or issuing bank may access information in the repository using a derivative locator. The derivative locator may be determined based on information provided to the acquiring bank, global financial network, and/or issuing bank within a normal pipeline for financial services.

Figure 2:
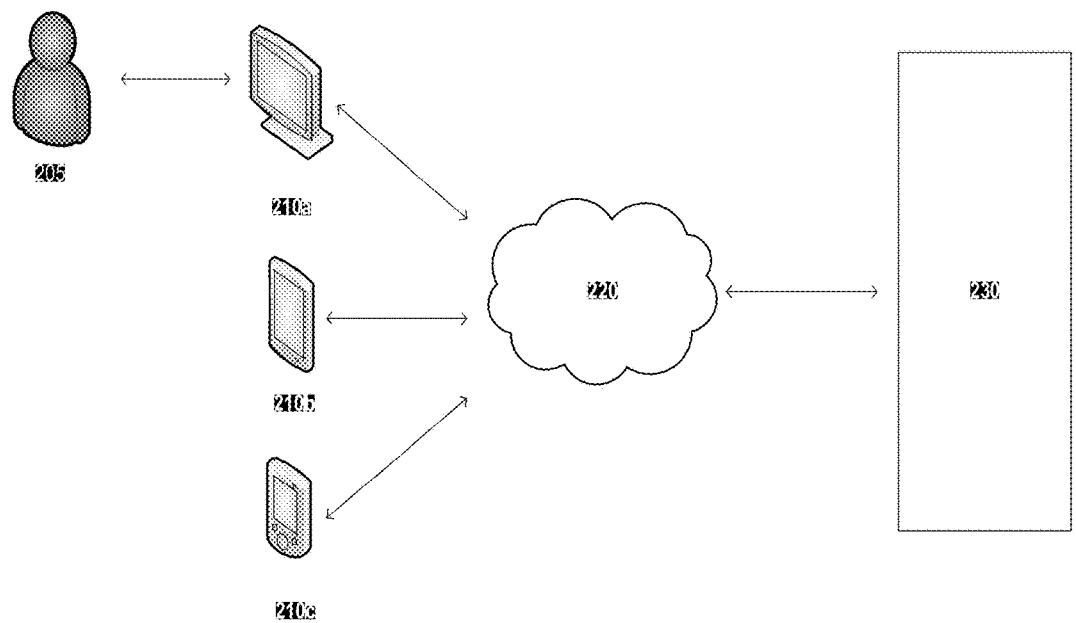
FIG. 2 provides an example of a portion of an information access system through which users may interact with the system.

A consumer 105 may interact with a merchant 110. In some embodiments, a consumer may interact with a merchant via one or more device. FIG. 2 provides a further example of how a user, such as a consumer, may interact with a member of the system, such as a merchant. The merchant may have an electronic storefront, and a consumer may be purchasing one or more item online. For example, the electronic storefront may be provided on a website. The device may use a browser or application to permit the consumer to view the electronic storefront. The item may include goods, and/or services. A financial transaction may occur between a consumer and the merchant. The financial transaction may be an online transaction. Any description of a merchant may apply to any provider of goods or services, or party involved in a financial transaction with the consumer. A consumer may be an individual, an entity (e.g., company, corporation, organization), and/or an individual associated with the entity.

The consumer may interact with the merchant by providing a information about the consumer's payment methods. For example, the consumer may provide a credit card number, debit card number, gift card number, coupon number, certificate number, or any other type of payment information.

The consumer 105 may indicate which goods or services are being purchased from the merchant 110. The consumer may utilize the consumer's device and a user interface of the device to select the items for purchase and/or specify information about the financial transaction. In other embodiments, the consumer may be providing finances to the merchant without necessarily buying something (e.g., donation, transfer). Once the consumer is prepared to complete the transaction, the consumer may select a checkout option, or other comparable option.

The merchant 110 may provide information about the transaction and/or device to a repository 120, or alternatively the repository may collect the information from the consumer directly, on behalf of the merchant. In some instances, the repository may receive information directly from the consumer's device. Any description herein of information that is provided to the repository can originate from the merchant, from the consumer, from the consumer's device, or from any third party source. The information provided to the repository may include pre-analyzed information or may include raw information that the repository may analyze, or any combination thereof. The repository may be used to aggregate information and/or analyze the information. In some instances, the repository may analyze information to determine a reputation for a user and/or device. The repository may be used to determine the likelihood of fraud for a particular transaction, or the likely fraudulent user or device.

Transaction information may include personal information about the consumer, specifics about the transaction, and/or information about the device. For example, information about the device used by the consumer may be collected via the merchant or any intermediary third party. In one example, the device may have a local clock that may indicate a time for the device at any point in the transaction. For example, the time according to the clock of the device upon checkout may be collected. The time according to the clock when the consumer selects an option to initiate the checkout may be collected. The time according to the clock when other information relating to the transaction is sent may be collected and sent. The time according to the clock may be collected at one, two, or more points during the transaction. Time zone information about the device may be collected. This may include daylight savings time information. The time of the device relative to a standardized time (e.g., UTC time) may be collected. In some instances an IP address of the device may be collected. Any additional information about the device and/or configuration of the device may be collected. The merchant may provide this information to a central repository.

The merchant may optionally provide merchant data or pre-process the device data and send such information to the repository. For example, the merchant server may have a clock. The difference in time between the device clock and the merchant server clock may be calculated, thereby providing a time difference parameter. The time difference parameter may be sent to the repository. In some embodiments, the repository may have a server or other device which may have a clock. The difference in time between the device clock and the repository clock may be calculated, thereby providing a time difference parameter. In other embodiments, the difference in time may be calculated between the device clock and any reference clock. The reference clock can be a third party clock. The reference clock may be directed to any time zone which may be the same time zone as the device clock or different from the device clock time zone. The reference clock may be synchronized with UTC time. A time difference parameter may be calculated between the device clock and any reference clock. The time difference parameter may be provided to the repository. The time difference parameter may be provided by the device, the merchant server, or any third party. Alternatively, information to calculate the time difference parameter may be provided to the repository, which may perform the time difference calculation and derive the time difference parameter.

Information about the transaction may be provided to the central repository. For example, user information may be provided, such as a user's name, address, telephone number, email, date of birth, credit card number, credit card expiration date. Additional transaction information may be provided, such as items (e.g., goods or services) purchased, the transaction amount, taxes/fees, shipping, promotions/discounts, transaction breakdown, time of transaction, or any other information.

Figure 5:
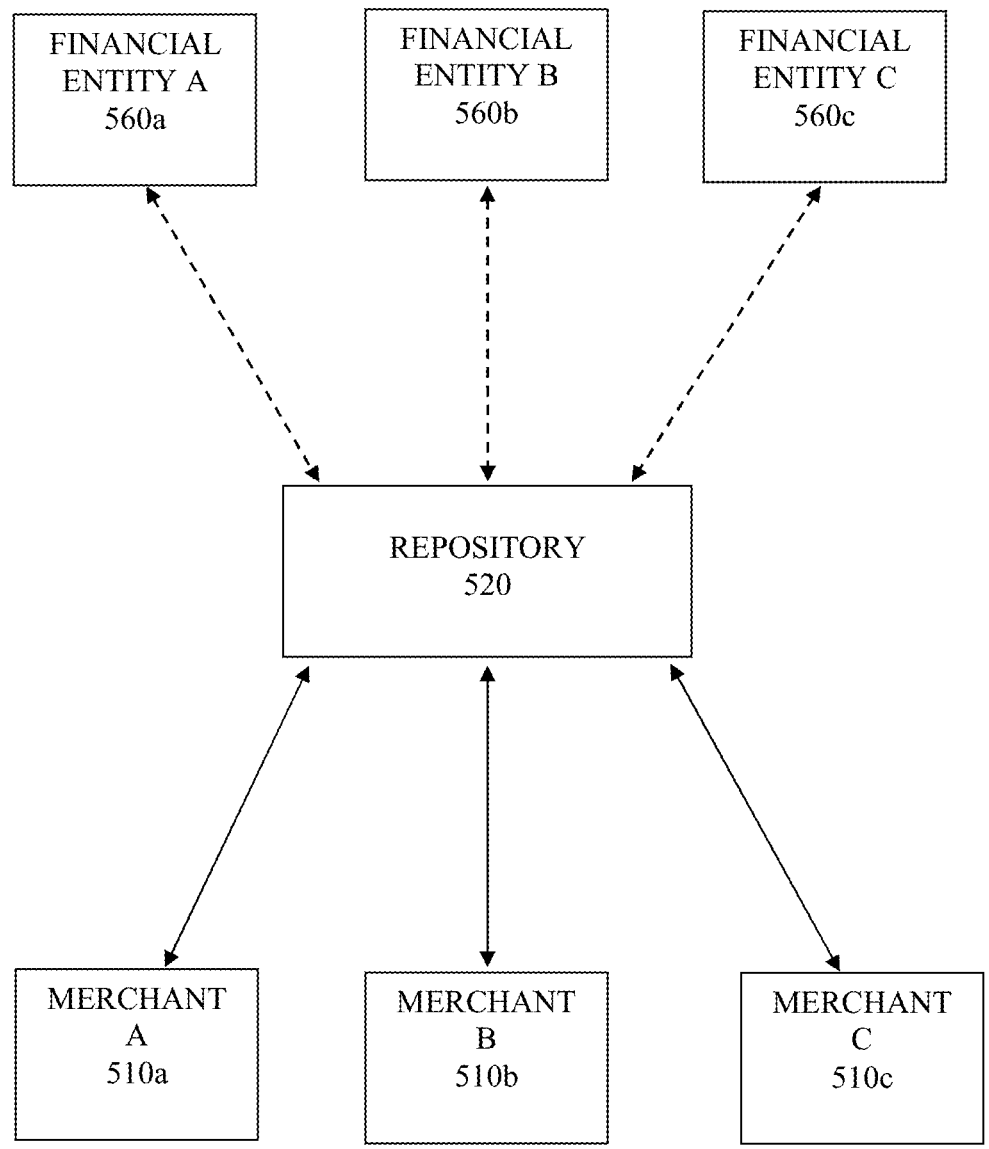
FIG. 5 shows an example of a records repository communicating with multiple sources in accordance with an embodiment of the invention.

Such information may be stored in the repository 120. Information from the merchant 110 across multiple transactions may be stored in the repository. The repository may receive information from one or multiple merchants. The repository may receive information from additional data sources or parties, which may or may not include acquiring banks, global financial networks, and/or issuing banks. FIG. 5 provides an example of a repository that may be in communication with multiple entities, to be described in greater detail elsewhere herein. The repository may be a central location at which information about devices, transactions, users, or any other related information may be deposited and/or accessed. Information may be aggregated from a single or multiple sources over time. Such information may or may not include indication of a likelihood of a fraudulent device, user, transaction and/or may associate one or more device, user, and/or credit card, with a fraudulent transaction. Some of the data in the central repository may be pre-analyzed to provide an indicator or likelihood of fraud or provide an identity. In some instances, one or more calculation may be made using the raw data. Alternatively, such information may include raw data that the querying party (e.g., acquiring bank, global financial network, and/or issuing bank) may utilize to determine a likelihood of fraud or provide an indicator of identity. Some information may be used to determine a user and/or device reputation, which may include a good, bad, or neutral reputation. Such determination may be made by the repository. The repository may analyze aggregated information to determine reputation. The reputation may provide insight into how much a user and/or device can be trusted. In some instances, the reputation analysis may yield a reputation score (e.g., numerical value, letter grade, or any other measurement). For example, a reputation score may have a numeral value falling within a range (e.g., 1 to 10, 0 to 100) or a letter grade (e.g., A, B, C, D, E, . . . ). An increased score may be provided for users who regularly use the same devices. Information may be associated (e.g., in pairs or groups) and the score may depend on the number of times the associated information is seen together, or how long the associated information has been together. Alternatively, raw information may be provided to a querying party who may use the information to make a reputation determination.

One or more memory storage devices may be provided at a repository 120. A repository may include a single server or a plurality of servers. A repository may include a single database or a plurality of databases. Processing and/or memory storage units may be centralized and/or distributed. In some instances, a cloud computing infrastructure may be provided for the repository. In some instances, the repository may be owned and/or operated by a single entity. Alternatively, the repository may be owned and/or operated by a plurality of entities which may be in communication with one another and/or pooling resources. The repository may be accessible via a network (e.g., local area network (LAN), wide area network (WAN) such as the Internet, telecommunications network, cellular network, data network, or any other type of network).

The merchant 110 may provide information about the transaction to an acquiring bank 130. Such information may be provided concurrently with, subsequent to, or prior to providing information to the repository 120.

The acquiring bank 130 may be the merchant's bank. The acquiring bank may hold an account for the merchant, and may receive funds at the account. The acquiring bank may receive funds from an issuing bank (e.g., directly or indirectly). The information provided to the acquiring bank may be a subset of the information provided to the repository. Less information and/or some different information may be provided to the acquiring bank than the repository. Some of the information may be provided to both the acquiring bank and the repository. In some instances, the information provided to the acquiring bank may be information provided in a normal pipeline of financial transaction verification. For example, the information may include credit card number, credit card expiration date, name on the credit card, transaction amount, and/or items that were ordered. Such information need not include any specialized index or record locator in addition to the normal information that is provided in the course of financial transaction verification. Such information need not include any specialized device identification information. In some instances, funds transactions reports and/or chargeback reports may be provided between the merchant and the acquiring bank. Such reports may include any of the information described herein.

The acquiring bank 130 may provide information about the transaction to a global financial network 140. The global financial network may be a card network, such as VISA, Mastercard, AMEX, Discover, Diners, etc. The information provided to the global financial network may be a subset of the information provided to the repository 120 and/or the acquiring bank. Less information and/or some different information may be provided to the global financial network than the repository and/or the acquiring bank. Some of the information may be provided to both the global financial network and the acquiring bank. In some instances, the information provided to the global financial network may be information provided in a normal pipeline of financial transaction verification. For example, the information may include credit card number, credit card expiration date, name on the credit card, and/or transaction amount, like in ISO 8583 protocol, see e.g., http://en.wikipedia.org/wiki/ISO_8583 which is hereby incorporated by reference in its entirety. Such information need not include any specialized index or record locator that was shared with the merchant at the moment the transaction initiated, in addition to the normal information that is provided in the course of financial transaction verification. Such information need not include any specialized device identification information. After the merchant initiated an authorization request, and it may traverse the system, via acquiring bank, global network, issuing bank and all the way back—a record locator may be created and shared by all parties. However, this payment network record locator need not be present at the beginning of the transaction. In some instances, settlement files may be transferred between the acquiring bank and the global financial network. The settlement files may include the information described herein.

The global financial network 140 may provide information about the transaction to an issuing bank 150. The issuing bank may be the consumer's credit card bank. The issuing bank may be an institution for the consumer's payment method (e.g., credit card, debit card, gift card, etc.). The issuing bank may have funds retrieved therefrom, and sent to an acquiring bank (e.g., directly or indirectly). The consumer may have an account at the issuing bank, which may transfer funds from the account. The funds may be transferred from the consumer's account at the issuing bank to the merchant's account at the acquiring bank. The information provided to the issuing bank may be a subset of the information provided to the repository 120 and/or the global financial network. Less information and/or some different information may be provided to the issuing bank than the repository and/or the global financial network. Some of the information may be provided to both the issuing bank and the global financial network. In some instances, the information provided to the issuing bank may be information provided in a normal pipeline of financial transaction verification. For example, the information may include credit card number, credit card expiration date, name on the credit card, and/or transaction amount. Such information need not include any specialized index or record locator in addition to the normal information that is provided in the course of financial transaction verification. Such information need not include any specialized device identification information. In some instances, settlement files may be transferred between the global financial network and the issuing bank. The settlement files may include the information described herein.

In some instances, an issuing bank may ultimately send a billing statement to a consumer.

A derivative locator may be determined based on information provided in the normal pipeline of financial transaction verification. Additional embodiments or details relating to the derivative record locator may be provided in FIG. 3 or elsewhere herein. In one example, a derivative locator may be formed based on a consumer's credit card information (e.g., credit card number) and transaction amount (e.g., dollar amount, Euro amount, other currency amount). The derivative record locator may be the credit card number and transaction amount appended together. For example, the derivative record locator may be a concatenation of the credit card number and transaction amount. In other embodiments, a hash string or other identifier may be calculated or derived based on the credit card number only and the transaction amount will remain in the clear, and/or hashed separately (e.g., may or may not concatenated with the credit card).

The derivative locator may be used as an index to access one or more records in a repository. For example, transaction records, which may include device records may be stored in the repository and may be associated with an index corresponding to the derivative locator (e.g., credit card number+transaction amount). The records may be searched for a corresponding index (e.g., corresponding credit card number+transaction amount), and associated information may be accessed and/or pulled. Such associated information may be associated with the present transaction, user and/or the device used for the transaction. Associated information may also include analyzed information relating to the transaction, user and/or the device. Such analyzed information may include an indication of a likelihood of fraud and/or reputation information.

A time component may be provided. For example, the time when the request is made to access the repository records may be determined. A timestamp may be taken. The timestamp may be based on a clock of the requesting party (e.g., issuing bank, global financial network, and/or acquiring bank). The timestamp may be based on a clock of the repository and/or the merchant. The timestamp may be taken at a time a derivative locator is formed. The timestamp may be associated with the derivative locator. Alternatively, as the speed of the transaction in a real-time system is fast, when any party requests information from the repository, using the derivative locator—the look-back window to search for such a transaction can be limited to a short amount of time from "now", or the moment the repository receives the data request. This allows the time look-back to be dynamic, removing the need to send specific timestamps in the authorization message.

The timestamp may be compared to one or more timestamp provided in the records. For example, the time that a consumer selects a checkout option and/or sends information to the repository, one or more timestamp may be taken and/or stored in the repository. The new timestamp may be compared to the time data stored in the repository. If the difference between the new timestamp and the original timestamp does not exceed a threshold amount, then a transaction in the repository may be determined to be corresponding. Any time difference threshold may be selected or predetermined. For example, the difference between the look-up time and the repository record creation and/or check out may be less than or equal to about 1 minute, 30 seconds, 15 seconds, 10 seconds, 8 seconds, 5 seconds, 3 seconds, 2 seconds, 1 second, 0.5 seconds, or 0.1 seconds.

The time threshold comparison may be useful in situations where multiple transactions have been provided for a credit card, wherein the transaction amounts are substantially the same amount. The time threshold may provide an increased likelihood that the derivative locator is a unique identifier of a record in the repository corresponding to the particular threshold.

A derivative locator may be formed and/or timestamp may be taken at one or multiple points in the process. For example, the issuing bank 150 may attempt to access information in the repository 120. The issuing bank may form the derivative locator based on information available to the issuing bank. For example, the issuing bank may form a derivative locator based on the credit card number and transaction amount. A timestamp may be taken. The issuing bank may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The issuing bank may review the information from the data repository. The information from the data repository may include an indicator of a likelihood of fraud, or may be analyzed by the issuing bank to determine a likelihood of fraud. The information from the data repository may include an indicator of device and/or user reputation, or be analyzed by the issuing bank to determine the device and/or user reputation. Reputation information may or may not be used in the determination of likelihood of fraud, and vice versa. The issuing bank may make a determination whether to accept or decline the financial transaction, based at least partially on information provided by the repository. For example if information from the repository indicates suspicious behavior or a low reputation, the issuing bank may decide to decline the financial transaction. The issuing bank may make the determination in an automated fashion with aid of a processor, without requiring human intervention. Alternatively, the bank may include one or more users reviewing information and assisting with the determination. The indication of whether the issuing bank accepts or declines the transaction may be sent to the global financial network, which may pass it on to the acquiring bank, which may relay it to the merchant. The merchant interface may display to the consumer whether the transaction was accepted or declined. In some instances, the consumer may be prompted for additional information that may be required in order for the transaction to proceed.

In some instances, the derivative locator and/or timestamp may be taken via the global financial network 140. For example, the global financial network may attempt to access information in the repository 120. The global financial network may form the derivative locator based on information available to the global financial network. For example, the global financial network may form a derivative locator based on the credit card number and transaction amount. A timestamp may be taken. The global financial network may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The global financial network may review the information from the data repository. The information from the data repository may include an indicator of a likelihood of fraud, or may be analyzed by the global financial network to determine a likelihood of fraud. The information from the data repository may include an indicator of device and/or user reputation, or be analyzed by the global financial network to determine the device and/or user reputation. Reputation information may or may not be used in the determination of likelihood of fraud, and vice versa. The global financial network may make a determination whether to accept or decline the financial transaction, based at least partially on information provided by the repository. For example if information from the repository indicates suspicious behavior, the global financial network may decide to decline the financial transaction. The global financial network may make the determination in an automated fashion with aid of a processor, without requiring human intervention. Alternatively, the global financial network may include one or more users reviewing information and assisting with the determination. The indication of whether the global financial network accepts or declines the transaction may be sent to the acquiring bank, which may relay it to the merchant. The merchant interface may display to the consumer whether the transaction was accepted or declined. In some instances, the consumer may be prompted for additional information that may be required in order for the transaction to proceed.

Additionally or alternatively, the derivative locator and/or timestamp may be taken via the acquiring bank 130. For example, the acquiring bank may attempt to access information in the repository 120. The acquiring bank may form the derivative locator based on information available to the acquiring bank. For example, the acquiring bank may form a derivative locator based on the credit card number and transaction amount. A timestamp may be taken. The acquiring bank may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The acquiring bank may review the information from the data repository. The information from the data repository may include an indicator of a likelihood of fraud, or may be analyzed by the acquiring bank to determine a likelihood of fraud. The information from the data repository may include an indicator of device and/or user reputation, or be analyzed by the acquiring bank to determine the device and/or user reputation. Reputation information may or may not be used in the determination of likelihood of fraud, and vice versa. The acquiring bank may make a determination whether to accept or decline the financial transaction, based at least partially on information provided by the repository. For example if information from the repository indicates suspicious behavior, the acquiring bank may decide to decline the financial transaction. The acquiring bank may make the determination in an automated fashion with aid of a processor, without requiring human intervention. Alternatively, the acquiring bank may include one or more users reviewing information and assisting with the determination. The indication of whether the global acquiring bank accepts or declines the transaction may be sent to the merchant. The merchant interface may display to the consumer whether the transaction was accepted or declined. In some instances, the consumer may be prompted for additional information that may be required in order for the transaction to proceed.

Thus, one, two, three or more of the acquiring bank 130, global financial network 140, or issuing bank 150 may access the repository 120. The acquiring bank 130, global financial network 140, and/or issuing bank 150 may provide a derivative locator to access the repository. The derivate locators may be the same between the acquiring bank, global financial network, and/or the issuing bank. The derivative locator may be unique or pseudo-unique and provide the desired lookup.

FIG. 2 provides an example of a portion of an information access system through which users may interact with the system. One or more devices 210*a*, 210*b*, 210*c* may be in communication with one or more servers 230 of the information access system over a network 220.

One or more user 205 may be capable of interacting with the system via a device 210*a*, 210*b*, 210*c*. In some embodiments, the user may be a consumer. The user may be an individual attempting to initiate a financial transaction. The user may be attempting to purchase goods or services online. The user may use a credit card, debit card, pre-paid card, gift card, bank routing number, or other type of financial payment techniques or instruments.

The device may be a computer 210*a*, laptop, or mobile device (e.g., tablet 210*b*, smartphone 210*c*, cell phone, personal digital assistant) or any other type of device. The device may be a networked device. The device may have a memory, processor, and/or display. The memory may be capable of storing persistent and/or transient data. Those persistent and /or transient data may be stored in the cloud. Non-transitory computer readable media containing code, logic, or instructions for one or more steps described herein may be stored in memory. The processor may be capable of carrying out one or more steps described herein. For example, the processor may be capable of executing the non-transitory computer readable media. A display may show data and/or permit user interaction. For example, the display may include a screen, such as a touchscreen, through which the user may be able to view content. The display may be capable of displaying images (e.g., still or video), text. The device may be capable of providing audio content. The display may include a user interface capable of displaying a web browser or application. For example, the device may display a merchant website through which a user may purchase goods or services.

The device may be able to receive an input from a user. For example, a device may have or accept input from a computer, mouse, joystick, trackball, pointer, pen, microphone, motion sensor, optical sensor, infrared sensor, capacitive sensor, pressure sensor, camera, touchscreen, or any other input device. The user may be able to enter information relating to a transaction via any input device.

The device may have a clock or other timekeeping device. The device clock may indicate a time for the device, which may or may not correspond to an objective time for a location of the device. The device clock may or may not be synchronized with other clocks. The device may have an Internet Protocol (IP) address.

The device 210a, 210b, 210c may be capable of communicating with a server 230. Any description of a server may apply to one or more servers and/or databases. The one or more servers may include a memory and/or programmable processor. A plurality of devices may communicate with the one or more servers. Such communications may be serial and/or simultaneous. The server may be a merchant server. The server may be owned and/or operated by the merchant.

The programmable processor of the server may execute one or more steps as provided therein. Any actions or steps described herein may be performed with the aid of a programmable processor. Human intervention may not be required in automated steps. The programmable processor may be useful for analyzing user input and/or managing transaction and/or device information. The server may also include memory comprising non-transitory computer readable media with code, logic, instructions for executing one or more of the steps provided herein.

The server may have a clock or other timekeeping device. The server clock may indicate a time for the server, which may or may not correspond to an objective time for the location of the server. The server clock may or may not be synchronized with other clocks.

The device 210a, 210b, 210c may communicate with the server 230 via a network 220, such as a wide area network (e.g., the Internet), a local area network, or telecommunications network (e.g., cellular phone network or data network). The device and/or server may have a wired or wireless transceiver and/or assembly that may expedite communications over the network. Communication may also be intermediated by a third party.

In one example, a user may be interacting with the server via an application or website. For example, the user may be viewing and/or purchasing items, via the user's device. A user interface may be provided via a display of the user's device. The user may provide personal information about the user. The user may provide the user's credit card information. Information about the user, transaction, and/or device may be collected (e.g. on the browser side or through an application on the device). The information may be collected and provided to the server. The server may or may not perform analysis of the collected information and/or provide additional calculations. For example, the server may calculate a difference in time between the device clock and the server clock. Information collected and provided to the server may include a timestamp from the device, which may be compared with a timestamp from the server. The difference in time may be a parameter that may be shared with one or more additional data repositories. The server may communicate with one or more additional entity servers or repositories over a network, such as networks described elsewhere herein.

FIG. 3 shows an example of a derivative locator used to access information a repository. A current transaction (e.g., transaction N) may be underway and pending approval of a checkout. A derivative record locator may be derived from information accessible to one or more financial party. Such information may include financial transaction information that is provided to the financial parties within the normal pipeline of a transaction. In one example, a derivative record locator (N) may be formed based on the credit card number and transaction amount for the current transaction. The derivative locator may be any form of locator that is derived from the credit card number and transaction amount. Additional information may or may not be included in forming the derivative locator. In one example, the credit card number and transaction amount may be appended together. For example, if the credit card number is: 1234567812345678, and the transaction amount is $79.18, the derivative locator may be 1234567812345678789.18 or 79.181234567812345678, or a hashed value of the credit card ABCDE12345 and 79.18, or any other combination thereof. In other examples, one or more calculation may be performed. A hash string may be generated using the credit card number and transaction amount or other factors. A mathematical calculation may be performed using the credit card number and transaction amount or other factors. Alphanumeric or other representations of the credit card number and transaction amount or other factors may be provided. The derivative locator may be stored in a memory of the repository. The derivative locator may be stored in the memory and associated with or linked to related records in the repository.

Any description herein of a credit card may also apply to debit cards, pre-paid cards, gift cards, routing numbers, or any other financial identifier. For example, the derivative locator may be formulated based on a debit card number and transaction amount.

A timestamp (N) may be made when attempting to find a record in the repository. The timestamp may be taken when formulating the derivative locator. The timestamp may be indicative of a time of a requesting party (e.g., issuing bank, global financial network, or acquiring bank) clock, repository clock, or merchant clock. The timestamp (N) of the current transaction may be indicative of the time at which the repository is being accessed.

A repository may include information from one or more merchants relating to one or more transactions. The repository may include information from other data sources. The repository may include information from the current transaction (N). The information from the current transaction (N) may have been provided by the merchant in the current transaction. The information from the current transaction may be associated with or combined with other information already in the repository. One or more common hook may be provided between the associated information. For example, the repository may include information about the device used in the current transaction. Other information relating to the same device (or a device identified as likely being the same device) from other transactions (e.g., with the same or different merchants) may also be associated with the current transaction information. In another example, the repository may include information about the credit card used in the current transaction. Other information relating to the same credit card from other transactions (e.g., with the same or different merchants, with the same or different device) may be associated with the current transaction information. Alternatively, the transaction information may be standalone and need not be associated with other information outside the various transactions.

In some embodiments, a device locator may be generated each time a transaction is initiated and information is sent to the repository. For example, for a transaction 1, a derivative locator (DL1) may be generated and stored in the repository.

A corresponding timestamp (T1) may be stored in the repository. Associated transaction information (e.g., information relating to the user, device, credit card, financials, transaction specifics) may be stored in the repository and may be associated with the derivative locator (DL1) and corresponding timestamp (T1). For other transactions (e.g., transaction 2), its own derivative locator (DL2) and associated timestamp (T2) may be stored in the repository. Information associated with the transaction (e.g., transaction 2) may be associated with its derivative locator (DL2) and timestamp (T2). Associated derivate locators and/or timestamps may be associated with each of the transaction records in the repository. The derivative locators may form a searchable field or index through which to access associated transaction information from the repository.

In the current transaction (N), a derivative locator (DLN) may be formulated based on information available to the party requesting information from the repository. The derivative locator (DLN) may be compared with one or more derivative locators in the repository (DL1, DL2, DL3, ...). When a match is found, the associated information may be accessed by the requesting party.

In some embodiments, one or more timestamp may be utilized before providing information to the requesting party. In one example, the derivative locators may be relatively unique, but may not be completely unique. For instance, the derivative locators may be a combination of a credit card number and transaction amount. It is possible that the same credit card was used in multiple transactions that have the same transaction amounts (e.g., for credit card 1234567812345678, two purchases for $79.18 were made, one in the current transaction and one last month).

In order to ensure access to the correct current transaction information in the repository, timestamps may be compared. The difference between the timestamp when requesting the repository information (e.g., TN) and the timestamp stored in the repository for the corresponding derivative locator may be calculated (e.g., if DL4 corresponds to DLN, the difference between T4 and TN may be determined). If the difference in the timestamps does not exceed a time threshold value, then the record with the corresponding derivative locator may be determined to be the record for the transaction and may be accessed by or sent to the requesting party. If the difference in timestamps does exceed the time threshold value, then the transaction in the repository likely refers to a separate transaction, and this transaction information is not accessed. For example, the transfer of information within the system (e.g., between the merchant, acquiring bank, global financial network, and/or issuing bank) may occur rapidly. The transfer of information may occur in an automated fashion with aid of a processor, without requiring human intervention. The time threshold value may be greater than the anticipated time for information to travel from the merchant to the requesting party. For example, the time threshold value may be on the order of tens of seconds or less, or seconds or less. For example, if the derivative locators match, and the timestamp in the repository indicates that transaction record was created at 01:00:01.00, and the timestamp with the request indicates that the current time is 01:00:01.10, then it is likely that the record in the repository belongs to the current transaction.

The time threshold value may be predetermined and/or preset. Alternatively, the time threshold value may vary in response to one or more input. The time threshold may be dictated by the repository system. Alternatively, the time threshold value may be determined per requesting party (e.g., issuing bank, global financial network, acquiring bank).

Figure 4:
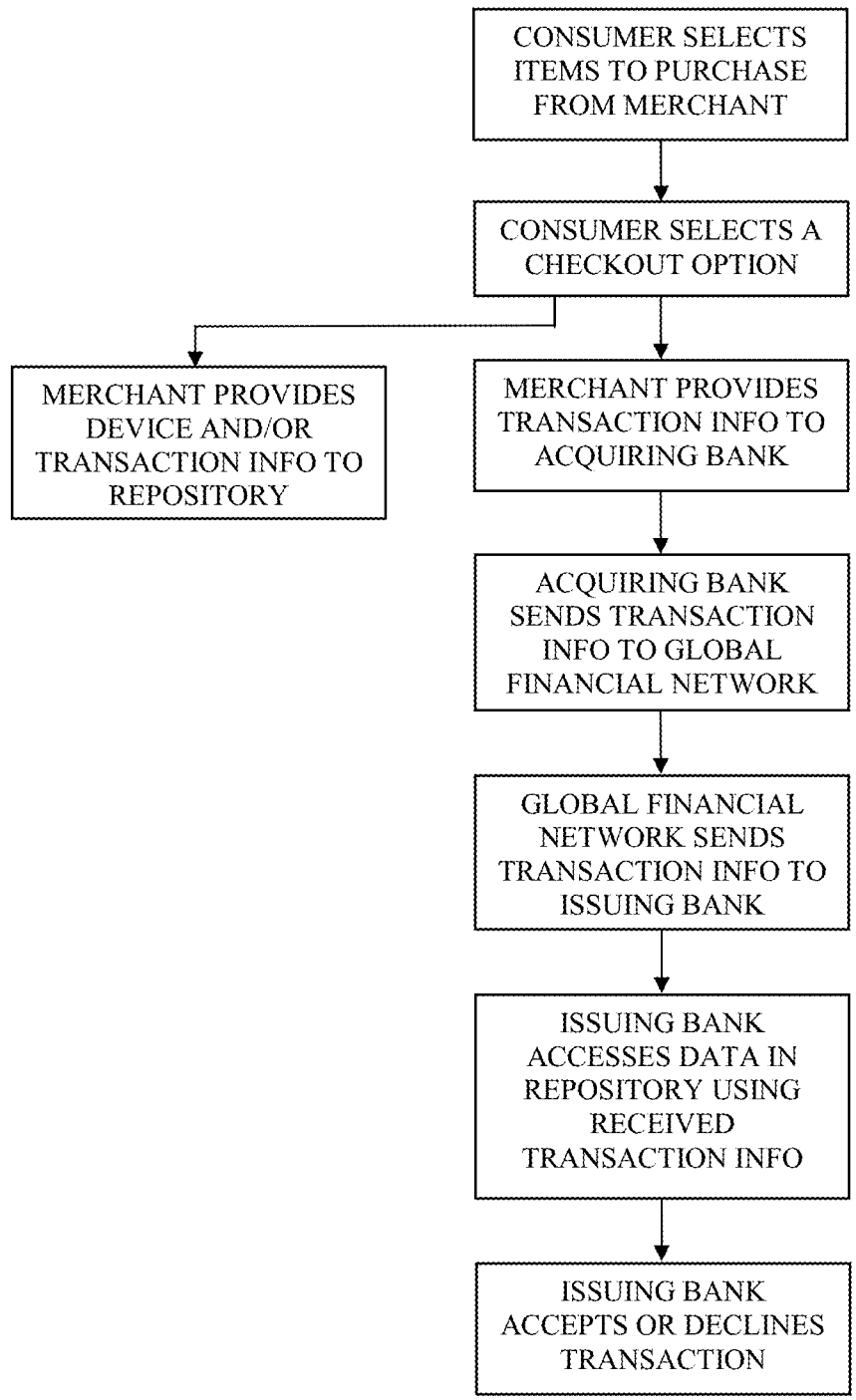
FIG. 4 shows an example of a commercial transaction process in accordance with an embodiment of the invention.

FIG. 4 shows an example of a commercial transaction process in accordance with an embodiment of the invention. One or more of the following steps may occur in the order presented, or in alternative orders. One or more of the steps may be optional. One or more additional steps may be provided or may be used in alternative to any of the steps described.

A consumer may select one or more item to purchase from a merchant. The consumer may be at the merchant website or application. The consumer may be accessing the merchant website or application using a device. The consumer may have filled up a virtual shopping bag with one or more items of goods or services. The items listed in the virtual shopping bag may be representative of physical goods or real-life services to be performed. Consumer financial information (e.g., consumer credit card information) may be entered by the consumer or may be pre-stored on the consumer's merchant account.

The consumer may select a checkout option. Once the consumer has selected the checkout option, the consumer may await confirmation or denial of the transaction. The entire confirmation or denial process may optionally occur in a rapid fashion. The confirmation or denial process may occur automatically with aid of one or more processors, and may or may not require human intervention. One or more of the steps described herein may be performed with aid of a programmable processor. In some instances, the entire process may take a few minutes or less, one minute or less, 30 seconds or less, 15 seconds or less, 10 seconds or less, 5 seconds or less, 3 seconds or less, 2 seconds or less, or 1 second or less.

When a consumer has selected a checkout option, the merchant may provide information to a central repository. The provided information may include information about the user (e.g., user name, address, contact information, date of birth, etc.), information specific to the transaction (e.g., transaction amount, items purchased in the transaction, fees, shipping, address, breakdown, taxes, promotions/discounts), and/or information about the device (e.g., device timestamp information, device time zone, IP address, other device configurations). The merchant may or may not perform any calculations from the merchant end (e.g., calculating a time difference parameter between based on time differences between the consumer device and a merchant server or other reference clock). The merchant may optionally provide information from the merchant server that may be used by the repository or other entity for analysis (e.g., sending merchant server clock time, and having the repository or requesting party calculate the difference between the device clock time and server or other reference clock time). The information provided to the repository may be useful in determining the likelihood of a fraudulent transaction and/or determining the reputation of the device or user. One or more discrepancies may be inherent within the transaction information (e.g., the device may be in a first time zone, while the credit card is addressed to an individual living in a different time zone). Optionally, transaction records within the repository may be linked or compared, or incorporated into one another (e.g., it may be noted that a particular credit card is typically associated with a particular device, device information may be compared to determine if different transactions occurred using the same device, user information may be compared to determine if different transactions were performed by the same user, or any combination thereof). Information within the central repository may be provided by the merchant in the current transaction. The repository may also include information from other merchants and/or from other transactions. The repository may also include information provided by other data sources. The repository may be updated in real-time. In some instances, the repository may provide an indication of a likelihood of fraud for a transaction, device, and/or user. This may incorporate the real-time information collected from one or more sources. The repository may provide reputation information for a device and/or user. The reputation information may incorporate the real-time information collected from one or more sources. The reputation information and/or fraud information may be determined separately or based on one another, and may optionally be provided in conjunction.

When a consumer has selected a checkout option, the merchant may provide information about the transaction to an acquiring bank. The merchant may provide information to the acquiring bank subsequent to, prior to, or concurrently with providing information to the repository. In some instances, it may be desirable to provide information to the repository first in order to ensure that the information is already in the repository if the acquiring bank decides to request information from the repository. Information may be provided to the acquiring bank in the usual process of confirming financial transaction information. Such information may include but is not limited to credit card number, name on the credit card, credit card expiration date, or transaction amount.

The acquiring bank may send transaction information to a global financial network. This may occur subsequent to the acquiring bank receiving transaction information from the merchant. Information may be provided to the global financial network in the usual process of confirming financial transaction information. Such information may include but is not limited to credit card number, name on the credit card, credit card expiration date, or transaction amount.

The global financial network may send transaction information to an issuing bank. This may occur subsequent to the global financial network receiving transaction information from the acquiring bank. Information may be provided to the issuing bank in the usual process of confirming financial transaction information. Such information may include but is not limited to credit card number, name on the credit card, credit card expiration date, or transaction amount.

The issuing bank may access data in the repository using the received transaction information. For example, at least a portion of the received transaction information may be used to formulate a derivative locator for accessing the records. For example, the received transaction information may include a credit card number and transaction amount (e.g., dollar amount or other currency amount). A derivative record locator may be formulated from the information. The derivative locator may match one or more derivative locators stored in the repository as indices to one or more records. A request timestamp may be generated when the issuing bank formulates the derivative locator and/or requests information from the repository. The records in the repository may include one or more stored timestamps indicative of when information was provided to the repository. The request timestamp may be compared with the stored timestamp. If not too much time has elapsed between the stored timestamp and the request timestamp, the corresponding records with matching derivative locators are determined to belong to the current (open, pending) transaction. The issuing bank may access the records in the repository associated with the matching derivative locators that fall within the acceptable time threshold. The repository may provide the issuing bank with any transaction-related information and/or information about the device and/or user. Linked and/or analyzed information from the repository, such as fraud or reputation information may be provided.

The issuing bank may accept or decline the transaction. The issuing bank may make a determination to accept or decline based on the information accessed from the repository. For example, the repository may include information that may assist with the determination of whether the transaction is likely to be fraudulent or not, or provide a reputation of the user and/or device. For example, the repository may include one or more "red flag" that may be indicative of low reputation, suspicious behavior or likely fraudulent transaction. This "red flag" information may be conveyed to the issuing bank. The issuing bank may or may not perform analytics of the information from the repository to determine whether a "red flag" is present. Such analysis may occur with aid of a programmable processor. If no red flags are detected, the issuing bank may decide to accept the transaction. The issuing bank may make notification of the acceptance of the transaction to the global financial network, which may convey the acceptance to the acquiring bank, which may convey acceptance to the merchant. The merchant may then close the transaction and indicate to the consumer that the transaction has been accepted. If one or more red flags may be detected, the issuing bank may determine whether the risk of fraudulent transaction is acceptable or not. If the risk is low enough to be acceptable, the transaction may be accepted, and parties may be notified accordingly. If the level of risk is too high, the issuing bank may decline the transaction and may inform the respective parties accordingly. The merchant may be informed that the transaction is denied. The merchant may inform the consumer that the transaction is denied.

The issuing bank is provided as an example of a requesting party of information from the repository. In other embodiments, the acquiring bank and/or the global financial network may request information from the repository. Similar techniques may be utilized. For example, the acquiring bank and/or global financial network may formulate a derivate locator based on received transaction information. The acquiring bank and/or global financial network may have a request timestamp. The timestamp may be compared with timestamps in the data repository, and the derivative locators may be compared with derivate locators in the repository. Corresponding information for the current (e.g., open, pending) transaction may be provided to the requesting party (e.g., acquiring bank and/or global financial network). Other related information from the repository (e.g., relating to the transaction, device, user, likelihood of fraud, reputation) may be provided to the requesting party. The requesting party may receive or analyze the information to determine whether to accept or decline the transaction. The transaction may be accepted or declined at any point along the process. The respective parties may be notified. In some instances, for a transaction to be completed and accepted, all parties (e.g., acquiring bank, global financial network, and issuing bank) may accept the transaction. A decline of the transaction at any point in the process may result in the entire transaction being declined.

Any of the steps described herein may be performed with the aid of a processor. In some instances, one or more of the steps may occur automatically without requiring human interaction. One or more computations or steps described herein may be performed in response to non-transitory computer readable media with code, logic, or instructions for performing the one or more steps.

FIG. 5 provides an example of a repository that may be in communication with multiple entities. As previously described one or more sources may provide information to a repository 520, which may include one or more merchant 510a, 510b, 510c, one or more devices, one or more financial entity, or other sources. Information from the repository may accessed by one or more querying party, which may include financial entities 560a, 560b, 560c (e.g., issuing bank, acquiring bank, global financial networks) or any other entities (e.g., merchants, user devices).

Information may be provided by one or more multiple sources and collected within the repository. The information may be aggregated and/or analyzed at the repository. Information from various transactions or sources relating to the devices that are likely to be the same device, and/or users likely to be the same user may be linked or associated with one another. In some instances, a reputation score may be determined and/or associated with the respective transactions, devices, and/or user records. The repository may take advantage of information from various sources and bring them together to provide an comprehensive and up-to-date analysis.

One or more sources may provide information to a repository. The one or more sources may or may not access information from the repository. In some instances, an entity may provide information to the repository without accessing or using information from the repository, may access or use information from the repository without providing information to the repository, or may both provide information to the repository and access or use information from the repository. The one or more sources may be owned and/or operated by different entities, such as companies or subsidiaries thereof In some examples, various merchants may provide information to the repository from various merchant transactions and may use the information from the repository. Thus, merchants communicating with the repository may share information with one another via the repository. Similarly, various banks, global financial networks, or other financial entities may provide information to the repository and may use information from the repository. The financial entities may provide information relating to a user's financials, merchant's financials, or any transactions. Thus, the financial entities communicating with the repository may share information with one another via the repository. The merchants and financial entities may share information with one another, and optionally additional entities, via the repository.

The systems and methods described herein may advantageously permit the access of information that may assist with the determination of whether a financial transaction may be fraudulent or not. The repository may serve as a central data repository where information may be gathered across multiple transaction (e.g., across one or multiple merchants). This may permit the sharing of data which may reveal patterns or indicators of fraud or suspicious behavior. The sharing of data may also assist with formulating a reputation for devices and/or users over time. The reputation may be based on device information without being based on user information, user information without being based on device information, or based on both device and user information. Optionally, the reputation may be determined without requiring the use of a user's personal information.

The sharing of data may permit a device and/or user's reputation to follow him or her to an interaction with a new entity, such as a new merchant. Thus, even if it is a user or device's first time interacting with a merchant, the user may have a positive, negative, or neutral reputation based on the shared data. In some instances, the shared data may include a reputation indicator, such as a score. The reputation of a user and/or device may be indicative of a risk associated with interacting with the user and/or device. In some instances, negative reputations may be relevant for determining a likelihood of fraud.

Positive reputations may be useful for verifying or authenticating an individual or device. In some instances, positive reputation scores may be useful for identifying good users or devices, which may afford specialized status or treatment. In some instances, positive reputations may result in confirmation of a transaction with fewer checks or delay. In some instances, a positive reputation may enable a user to be approved for a transaction with fewer checks or delay, even if it is the first time or one of the first times that a user is interacting with a particular party (e.g., merchant). This may save efforts on the merchant side to verify the user and permit the merchant to allocate efforts elsewhere. This may also save time for the user, and permit rapid verification and/or approval for transactions. Having a positive reputation may enable a user to go through and participate in a transaction during a denial of service attack. Other examples of specialized status or treatments may include the offer of discounts, cash, rewards, coupons, free shipping, no or less wait-time, special access, higher level of service, or any other type of specialized treatment. Having a positive reputation may enable the user to received the specialized status or treatment without any or with very little investigation from the merchant, by leveraging historical information about the user and/or device collected from various merchants.

Good or bad reputation information may be useful when a user is opening an account, logging into an account (e.g., being authenticated), or is a new or repeat buyer (e.g., undertaking a transaction). Historical reputation information from a data repository can be used to approve or not approve a transaction. This may advantageously permit increased sales and approval rates for the entire system, and increase customer satisfaction. More transactions may be approved through the use of repository data. This may also decrease fraud losses over the system, and decrease operational costs.

Longitudinal data collected over time may be useful for the determination of fraud or reputation. The repository may include information relating to the consumer's device used in the transaction. The device information may be useful for assessing a risk of fraud or determining a reputation.

In typical financial transactions, certain information may be conveyed between parties (e.g., merchant, acquiring bank—such as merchant bank; global financial network—such as Visa, Mastercard, Amex, Diners, or others; and issuing bank—such as consumer's credit card bank). The information provided within the normal pipeline for financial transactions may include the consumer's credit card and transaction information. It may be desirable for the parties to access additional information about the transaction, device, and/or user which may be useful for the parties to assess risk of fraud prior to accepting or declining the financial transaction. However, it may not be desirable to alter the existing information pipeline between the parties. Thus, informational infrastructure challenges may be presented if the additional information (such as device information, or a foreign key index to records in the repository) was conveyed by the merchant to the other parties. This may require restructuring of data storage systems in various parties. Systems and methods provided herein permits a data repository to aggregate and/or analyze information provided from one or more sources, which may be accessible by various querying parties without altering the existing information pipeline between the parties. A likelihood of fraud and/or reputation can be determined and take full advantage of the aggregated information without having to alter the existing information pipeline.

Thus, the system provided herein may advantageously permit the use of the existing data pipelines, but permit the requesting parties to access additional information (e.g., provided in an repository) that may assist with determination of whether there is a fraudulent transaction. The existing data may be used to formulate the record locator which can be used to access the additional information.

Figure 6:
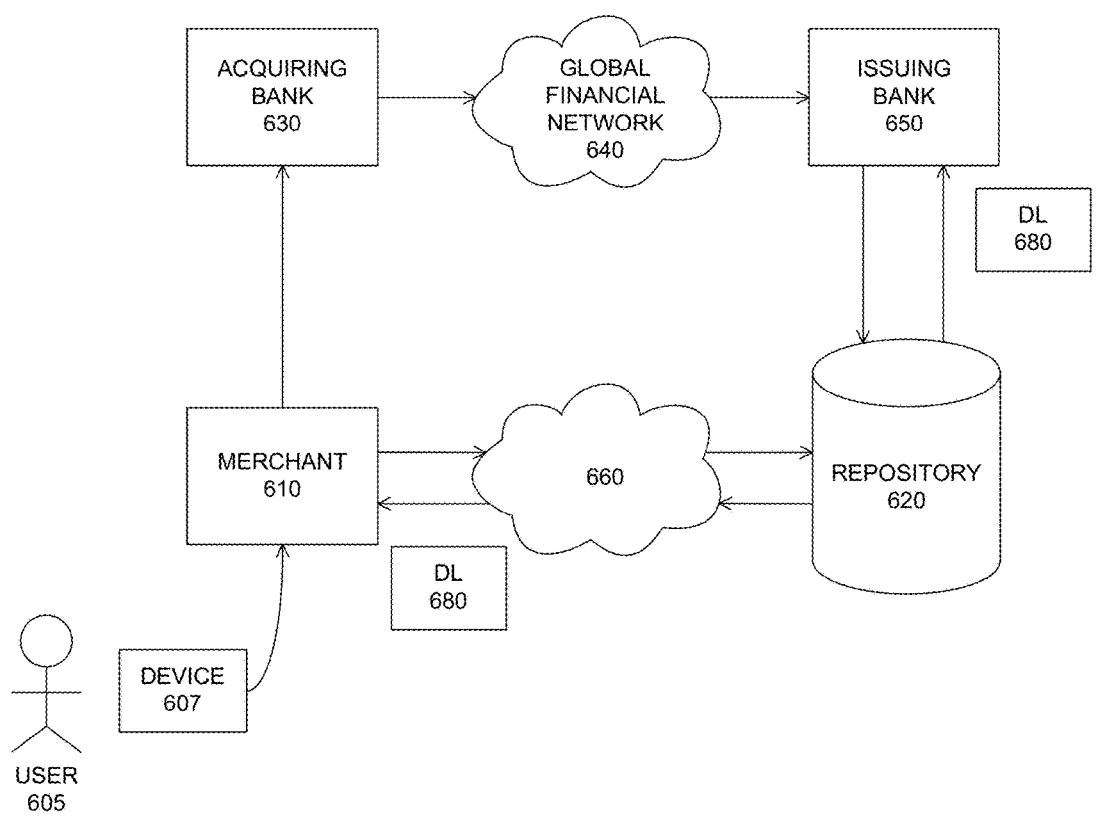
FIG. 6 shows an example of a records access system utilizing a repository in accordance with another aspect of the invention.

FIG. 6 provides an additional illustration of a records access system utilizing a repository in accordance with an embodiment of the invention. A user 605 may use a device 607 to interact with a merchant 610. The user may use the device to facilitate a transaction with the merchant. The transaction may be a financial transaction. In some instances, the user device may have a processor, a memory, and a user interface through which the user may interact with the device. The user device may have a communication assembly through which the device may communicate with a device of the merchant, e.g., merchant sever.

In one example, a user 605 may provide the user's credit card (or debit card, gift card, or other financial payment) information to the merchant through the device 607. The user may select a submit option to open the transaction. The transaction may remain open until it is approved by the user's issuing bank. The merchant 610 may send information about the transaction to an acquiring bank 630. The acquiring bank may have a device (e.g., server, databases) having a processor and memory. The memory may store information about the merchant's financial records. The acquiring bank may send information about the transaction to a global financial network 640. The global financial network may have a device (e.g., server, databases) having a processor and memory. The global financial network may send information about the transaction to an issuing bank 650. The issuing bank may have a device (e.g., server, databases) having a processor and memory. The memory may store information about the user's financial records.

In some instances, a derivative locator 680 may be formulated based on the transaction information. The derivative locator may be formed by the merchant, repository, acquiring bank, global financial network, issuing bank, user device, or any other entity. The derivative locator may be formulated based on the transaction information that is passed on to the acquiring bank, global financial network, and/or issuing bank. The derivative locator may be formulated by accessing memory storage units of the merchant, repository, acquiring bank, global financial network, issuing bank, user device, or any other entity. The derivative locator may be formulated with aid of a processor of the merchant, repository, acquiring bank, global financial network, issuing bank, user device, or any other entity. Examples of derivative locators are provided elsewhere herein.

A repository 620 is provided through which a merchant 610 may communicate. Two-way communication may be provided between the repository and the merchant. In some instances, communication between a merchant and repository may occur over a network 660, which as a local area network, wide area network (e.g., Internet), telecommunications network, cellular network, data network, or any other type of network. Alternatively such communications may occur directly. One or more merchants may be capable of communicating with the repository over the network. The one or more merchants may communicate with the repository simultaneously. A derivative locator 680 may be used during locations between the merchant and the repository. The merchant may use the derivative locator to access records in the repository. The derivative locator may serve as an index of records in the repository.

In some instances, the merchant 610 may provide information to the repository 620. The merchant may provide information about the user 605, user device 607, and/or transaction. In some instances, the merchant may provide information about whether a transaction was approved or not approved. The merchant may provide information about whether a transaction went through smoothly or whether any red flags occurred during or after the transaction. In some instances, the information from the merchant may be coupled with a derivative locator when sent to the repository. The derivative locator may be formulated by the merchant. Alternatively, information may be sent to the repository, and the derivative locator may be formulated at the repository using the information from the merchant.

In some embodiments an issuing bank 650 may communicate with the repository 620. Two-way communication may be provided between the issuing bank and the repository. In some instances, communication between the issuing bank and the repository may occur over a network, or may occur directly. One or more banks or other financial entities may be capable of communicating with the repository over the network. The one or more banks or other financial entities may communicate with the repository simultaneously. A derivative locator 680 may be used during locations between the bank and the repository. The bank may use the derivative locator to access records in the repository. The derivative locator may serve as an index of records in the repository. In some examples, an issuing bank may formulate a derivative locator based on information passed from the merchant through the acquiring bank and global financial network.

In some instances, the issuing bank 650, acquiring bank, global financial network, or any other type of entity may provide information to the repository 620. The bank or any other financial entity may provide information about the user 605, user device 607, the user's finances, and/or transaction. In some instances, the bank may provide information about whether a transaction was approved or not approved. The bank may provide information about whether an approval went through smoothly or whether any red flags occurred during or after the transaction. In some instances, the information from the bank may be coupled with a derivative locator when sent to the repository. The derivative locator may be formulated by the bank. The derivative locator may be formulated based on transaction information passed from the merchant to the bank through any intervening entities. Alternatively, information may be sent to the repository, and the derivative locator may be formulated at the repository using the information from the bank.

The derivative locator may be formulated by any entity along the transaction and/or transaction approval process. The derivative locator may be formulated based on information accessible by any entity along the transaction approval process. Information accessible by the entities along the transaction approval process may be used to formulate the derivative locator at the repository.

Any entity accessing the repository may access information provided to the repository by any other entity. Access and/or storage of information may be governed by a derivative locator which may be formulated on information that is accessible to the entities. In some instances, all entities of the system may have access to the information used to formulate the derivative locator. In some instances, the user device, merchant, acquiring bank, global financial network, and/or issuing bank may receive or have access to the information used to formulate the derivative locator. The information stored in the repository may be useful to determine whether to approve a transaction between a user device and a merchant. The information stored in the repository may be useful to determine whether to approve a transaction between a user and any entity that may have access to the repository. The information stored in the repository may include reputation information for the user and/or user device.

Any of the entities described herein may have a clock or other time-keeping device. For example a user device may have a local device clock, a merchant may have a merchant server clock, an acquiring bank may have an acquiring bank server clock, a global financial network may have a global financial network server clock, and/or an issuing bank may have an issuing bank server clock. The repository may or may not have a repository clock. Times from the clocks may be useful to access records within the repository. In some instances, a combination of the derivative locator and time information (e.g., based on one or more clocks) may be useful for accessing records within the repository.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of providing fraud indicators, the method comprising:
   receiving, by a computer processor of a fraud detection server, an encrypted transaction data packet comprising first transaction information associated with a financial transaction verification standard from a transaction processing computing server for an open transaction, the encrypted transaction data packet comprising a first timestamp and the first transaction information comprising shared transaction specific information available to a plurality of servers including at least the fraud detection server, a remote financial server, and the transaction processing computing server, wherein the shared transaction specific information is a subset of the transaction information and the shared transaction specific information is communicated from one computing server to another computing server in the plurality of servers to process the open transaction in accordance with the financial transaction verification standard;
   formulating, by the computer processor of the fraud detection server, a first derivative locator based on the first transaction information, wherein the first derivative locator encodes at least a portion of the shared transaction specific information;
   linking, by the computer processor of the fraud detection server, an electronic transaction record describing the open transaction with the first derivative locator and the first timestamp;
   storing, by the computer processor of the fraud detection server, the linked electronic transaction record, the first derivative locator, and the first time stamp in a repository;
   receiving, by the computer processor of the fraud detection server, a request for the electronic transaction record from the remote financial server, wherein the request comprises a second encrypted transaction data packet comprising a second timestamp and second transaction information having the shared transaction specific information;
   determining, by the computer processor of the fraud detection server, a second derivative locator associated with the request, wherein the second derivative locator is formed based at least partly on second transaction information associated with the financial verification standard communicated from the transaction processing computing server to the remote financial server;
   searching, by the computer processor of the fraud detection server, the repository using the second derivative locator to find a matching first derivative locator; and
   in response to a determination that the first derivative locator is the same as the second derivative locator:
      determining, by the computer processor of the fraud detection server, a difference between the second timestamp and the first timestamp corresponding to the electronic transaction record; and
      in response to a determination that the difference between the first timestamp and the second timestamp is within a threshold value:
         receiving, by the computer processor of the fraud detection server, electronic records from the repository corresponding to the first derivative locator and the first time stamp, the records comprising the electronic transaction record describing the open transaction and one or more automated fraud analysis indicators associated with one or more of the records, the one or more automated fraud analysis indicator generated using device information in a plurality of records aggregated from multiple sources over time and including an indication of a likelihood that the open transaction is associated with a fraudulent device; and
         returning, by the computer processor of the fraud detection server, the electronic transaction record and the one or more automated fraud analysis indicators to the remote financial server.

2. The method of claim 1 wherein the derivative locator is formulated based on a credit card number used in the open transaction and a transaction amount from the open transaction.

3. The method of claim 1 wherein the derivative locator includes only transaction information for the open transaction that is transmitted to an issuing bank.

4. The method of claim 1 further comprising:
   capturing, by the computer processor of the fraud detection server, a request timestamp after receiving the second transaction information and prior to searching the repository; and comparing, by the computer processor of the fraud detection server, the request timestamp with the first timestamp in the repository corresponding to the first derivative locator.

5. The method of claim 4 further comprising determining the electronic transaction record is unrelated to the first transaction information if the difference in time between the first timestamp and the second timestamp exceeds a predetermined time threshold.

6. The method of claim 1 further comprising assessing a likelihood of fraud based on the electronic records received from the repository.

7. The method claim 6 wherein the open transaction is not completed if the likelihood of fraud exceeds a predetermined level.

8. The method of claim 1 further comprising providing at least some of the transaction information to the repository, and storing the transaction information as electronic records within the repository.

9. A system for providing an indicator of fraud, the system comprising:
a fraud detection server configured to establish a connection with a plurality of network servers over a network, the plurality of network servers comprising a transaction processing computing server and a remote financial server;
a data store configured to store computer-executable instructions; and
a processor in communication with the data store, the processor, when executing the computer-executable instructions, configured to:
receive an encrypted transaction data packet comprising a first transaction information associated with a financial transaction verification standard from the transaction processing computing server for an open transaction, the encrypted transaction data pack comprising a first timestamp and the first transaction information comprising shared transaction specific information available to a plurality of servers including at least the fraud detection server, the remote financial server, and the transaction processing computing server, wherein the shared transaction specific information is a subset of the transaction information and the shared transaction specific information is communicated from one computing server to another computing server in the plurality of servers to process the open transaction in accordance with the financial transaction verification standard;
formulate a first derivative locator based on the first transaction information, the first derivative locator formulated based on transaction information between a user device and a merchant, the derivative locator encoding at least a portion of the transaction information;
link an electronic transaction record describing the open transaction with the first derivative locator and the first timestamp;
store the linked transaction record, the first derivative locator and the first timestamp in a repository;
receive a request for the electronic transaction record from the remote financial server, the request comprising a second encrypted data packet comprising a second timestamp and second transaction information having the shared transaction specific information;
determine a second derivative locator associated with the request, wherein the second derivative locator is formed based at least partly on second transaction information associated with the financial verification standard communicated from the transaction processing computing device to the remote financial server;
search the repository using the second derivative locator to find a matching first derivative locator; and
in response to a determination that the first derivative locator is the same as the second derivative locator:
determine a difference between the second timestamp and the first timestamp corresponding to the electronic transaction record; and
in response to a determination that the difference between the first timestamp and the second timestamp is within a threshold value:
receive electronic records from the repository corresponding to the first derivative locator and the first timestamp, the records comprising the electronic transaction record describing the open transaction and one or more automated fraud analysis indicators associated with one or more of the records, the one or more automated fraud analysis indicators generated based on device information in a plurality of records aggregated from multiple sources over time and includes an indication of a likelihood that a fraudulent device is involved in the open transaction;
return the electronic transaction record and the one or more automated fraud analysis indicators to the remote financial server.

10. The system of claim 9, wherein the derivative locator is formulated based only on transaction information for the open transaction that is transmitted to an issuing bank.

11. The system of claim 9 wherein the derivative locator is formulated based on a credit card number, debit card number, or pre-paid card number used in the open transaction and a transaction amount for the open transaction.

12. The system of claim 9 wherein the processor further determines whether to approve or not approve the open transaction based on the one or more automated fraud analysis indicators.

13. The system of claim 9 wherein the one or more automated fraud analysis indicators includes a reputation score for the user device.

14. The system of claim 9 wherein the records received from the repository include information provided by at least one other merchant.

15. A non-transitory computer storage having stored thereon a computer program, the computer program comprising executable instructions that instruct a computer system to at least:
receive, by a computer processor of a fraud detection server, an encrypted transaction data packet comprising first transaction information associated with a financial transaction verification standard from a transaction processing computing server for an open transaction, the encrypted transaction data packet comprising a first timestamp and the first transaction information comprising shared transaction specific information available to a plurality of servers including at least the fraud detection server, a remote financial server, and the transaction processing computing server, wherein the shared transaction specific information is a subset of the transaction information and the shared transaction specific information is communicated from one computing server to another computing server in the plurality of servers to process the open transaction in accordance with the financial transaction verification standard;

formulate, by the computer processor of the fraud detection server, a first derivative locator based on the first transaction information, the first derivative locator encoding at least a portion of the shared transaction specific information;

link, by the computer processor of the fraud detection server, an electronic transaction record describing the open transaction with the first derivative locator and the first timestamp;

store, by the computer processor of the fraud detection server, the linked electronic transaction record, the first derivative locator, and the first time stamp in a repository;

receive, by the computer processor of the fraud detection server, a request for the electronic transaction record from the remote financial server, wherein the request comprises a second encrypted transaction data packet comprising a second timestamp and second transaction information having the shared transaction specific information;

determine, by the computer processor of the fraud detection server, a second derivative locator associated with the request, the second derivative locator formed based at least partly on second transaction information associated with the financial verification standard communicated from the transaction processing computing device to the remote financial server;

search, by the computing processor of the fraud detection server, the repository using the derivative locator to find a matching first derivative locator; and in response to a determination that the first derivative locator is the same as the second derivative locator:
  determine, by the computer processor of the fraud detection server, a difference between the second timestamp and the first timestamp corresponding to the electronic transaction record; and
  in response to a determination that the difference between the first timestamp and the second timestamp is within a threshold value:
    receive, by the computer processor of the fraud detection server, electronic records from the repository corresponding to the first derivative locator and the first time stamp, the records comprising the electronic transaction record describing the open transaction and one or more automated fraud analysis indicators associated with one or more of the records, the one or more automated fraud analysis indicator generated using device information in a plurality of records aggregated from multiple sources over time and including an indication of a likelihood that the open transaction is associated with a fraudulent device; and
    return, by the computer processor of the fraud detection server, the electronic transaction record and the one or more automated fraud analysis indicators to the remote financial server.

16. The non-transitory computer storage of claim 15 wherein the first derivative locator is formulated based on credit card number, debit card number, or pre-paid card number used in the open transaction and a currency amount from the open transaction.

17. The non-transitory computer storage of claim 15 wherein the repository stores records from a plurality of sources.

18. The non-transitory computer storage of claim 17 wherein the plurality of sources are a plurality of merchants with whom a user device participating in the open transaction has had previous transactions.

19. The non-transitory computer storage of claim 18 wherein the one or more automated fraud analysis indicators includes a reputation score for the user device formulated based on the previous transactions.

20. The non-transitory computer storage of claim 19, wherein the computer processor is further configured to:
  compare the reputation score with a predetermined threshold; and
  determine whether to approve the open transaction based on whether the reputation score exceeds the predetermined threshold.

* * * * *